(12) United States Patent
Zaus

(10) Patent No.: US 9,750,017 B2
(45) Date of Patent: *Aug. 29, 2017

(54) RESUMING PACKET SERVICES IN A MOBILE NETWORK

(71) Applicant: Intel Corporation, Santa Clara, CA (US)

(72) Inventor: Robert Zaus, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,054

(22) Filed: Jan. 7, 2016

(65) Prior Publication Data

US 2016/0119967 A1   Apr. 28, 2016

Related U.S. Application Data

(63) Continuation of application No. 14/141,067, filed on Dec. 26, 2013, now Pat. No. 9,320,063.

(Continued)

(51) Int. Cl.
*H04W 76/00* (2009.01)
*H04W 72/04* (2009.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
None
See application file for complete search history.

(56) References Cited

U.S. PATENT DOCUMENTS 8,170,081 B2   5/2012   Forenza et al.
8,213,978 B1   7/2012   Ho et al.
(Continued)

FOREIGN PATENT DOCUMENTS

CN   105229942 A   1/2006
CN   102484885 A   5/2012
(Continued)

OTHER PUBLICATIONS

"U.S. Appl. No. 14/141,206, Examiner Interview Summary mailed Jan. 25, 2016", 3 pgs.

(Continued)

*Primary Examiner* — Chirag Shah
*Assistant Examiner* — Amar Persaud
(74) *Attorney, Agent, or Firm* — Schwegman Lundberg & Woessner, P.A.

(57) ABSTRACT

This disclosure relates generally to resuming packet services in a mobile network. A device, method, and/or system may include switching, with user equipment, from communicating with a first radio access network to communicating with a second radio access network, setting, with a processor of the user equipment, a register of the user equipment to initiate packet services with the first radio access network, and transmitting, with the user equipment, a request to a core network node of the first radio access network to resume communications with the first radio access network based, at least in part, on the register.

18 Claims, 6 Drawing Sheets

Related U.S. Application Data

(60) Provisional application No. 61/841,230, filed on Jun. 28, 2013.

(51) Int. Cl.

| | | |
|---|---|---|
| H04W 76/02 | (2009.01) | |
| H04B 7/0452 | (2017.01) | |
| H04B 7/06 | (2006.01) | |
| H04W 56/00 | (2009.01) | |
| H04W 72/02 | (2009.01) | |
| H04L 25/02 | (2006.01) | |
| H04L 25/03 | (2006.01) | |
| H04W 88/02 | (2009.01) | |
| H04W 16/14 | (2009.01) | |
| H04W 8/00 | (2009.01) | |
| H04W 48/16 | (2009.01) | |
| H04L 12/18 | (2006.01) | |
| H04W 74/00 | (2009.01) | |
| H04W 74/08 | (2009.01) | |
| H04W 36/02 | (2009.01) | |
| H04W 68/04 | (2009.01) | |
| H04W 76/06 | (2009.01) | |
| H04B 7/024 | (2017.01) | |
| H04J 11/00 | (2006.01) | |
| H04L 5/14 | (2006.01) | |
| H04W 84/18 | (2009.01) | |
| H04W 88/06 | (2009.01) | |
| H04W 84/04 | (2009.01) | |
| H04W 48/12 | (2009.01) | |

(52) U.S. Cl.
CPC .......... *H04B 7/0626* (2013.01); *H04J 11/005* (2013.01); *H04L 5/1469* (2013.01); *H04L 12/18* (2013.01); *H04L 25/021* (2013.01); *H04L 25/0242* (2013.01); *H04L 25/03891* (2013.01); *H04W 8/005* (2013.01); *H04W 16/14* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/02* (2013.01); *H04W 76/028* (2013.01); *H04W 76/06* (2013.01); *H04W 88/02* (2013.01); *H04W 48/12* (2013.01); *H04W 72/0406* (2013.01); *H04W 84/045* (2013.01); *H04W 84/18* (2013.01); *H04W 88/06* (2013.01)

(56) References Cited

U.S. PATENT DOCUMENTS

| | | | |
|---|---|---|---|
| 8,259,599 | B2 | 9/2012 | Ghady et al. |
| 8,462,688 | B1 | 6/2013 | Dinan |
| 8,654,815 | B1 | 2/2014 | Forenza et al. |
| 8,682,354 | B2 | 3/2014 | Zhong et al. |
| 8,992,202 | B2 | 3/2015 | Pettis |
| 9,025,479 | B2 | 5/2015 | Gaal et al. |
| 9,046,591 | B1 | 6/2015 | Yang et al. |
| 9,179,328 | B2 | 11/2015 | Li et al. |
| 9,320,063 | B2 | 4/2016 | Zaus |
| 2004/0014501 | A1 | 1/2004 | Kuwahara et al. |
| 2006/0007043 | A1 | 1/2006 | Xin |
| 2007/0211813 | A1 | 9/2007 | Talwar et al. |
| 2008/0260918 | A1 | 10/2008 | Lai et al. |
| 2009/0323841 | A1 | 12/2009 | Clerckx et al. |
| 2010/0046643 | A1 | 2/2010 | Mondal et al. |
| 2010/0054237 | A1 | 3/2010 | Han et al. |
| 2010/0056216 | A1 | 3/2010 | Li et al. |
| 2010/0265841 | A1 | 10/2010 | Rong et al. |
| 2010/0316154 | A1 | 12/2010 | Park et al. |
| 2011/0069618 | A1 | 3/2011 | Wong et al. |
| 2011/0103305 | A1* | 5/2011 | Ali ............. H04W 76/062 370/328 |
| 2011/0143759 | A1 | 6/2011 | Choi et al. |
| 2011/0149852 | A1 | 6/2011 | Olsson et al. |
| 2011/0164668 | A1 | 7/2011 | Hoek et al. |
| 2011/0164696 | A1 | 7/2011 | Choi et al. |
| 2011/0244847 | A1 | 10/2011 | Mallik et al. |
| 2012/0014462 | A1 | 1/2012 | Zummo et al. |
| 2012/0071163 | A1 | 3/2012 | Klingenbrunn et al. |
| 2012/0082082 | A1 | 4/2012 | Etemad et al. |
| 2012/0165019 | A1 | 6/2012 | Shintani et al. |
| 2012/0252429 | A1 | 10/2012 | Yoshizawa |
| 2012/0258729 | A1 | 10/2012 | Siomina et al. |
| 2012/0322489 | A1* | 12/2012 | Liu ............. H04W 76/04 455/514 |
| 2013/0021925 | A1 | 1/2013 | Yin et al. |
| 2013/0034082 | A1 | 2/2013 | Etemad et al. |
| 2013/0039244 | A1* | 2/2013 | Sun .............. H04W 52/0235 370/311 |
| 2013/0064129 | A1 | 3/2013 | Koivisto et al. |
| 2013/0077513 | A1 | 3/2013 | Ng et al. |
| 2013/0083661 | A1 | 4/2013 | Gupta et al. |
| 2013/0083777 | A1* | 4/2013 | Rydnell ......... H04W 36/0022 370/331 |
| 2013/0088983 | A1 | 4/2013 | Pragada et al. |
| 2013/0107849 | A1 | 5/2013 | Park |
| 2013/0107977 | A1 | 5/2013 | Lakkis |
| 2013/0114576 | A1 | 5/2013 | Kwon et al. |
| 2013/0121185 | A1 | 5/2013 | Li et al. |
| 2013/0155962 | A1 | 6/2013 | Hakola et al. |
| 2013/0157670 | A1 | 6/2013 | Koskela et al. |
| 2013/0163457 | A1 | 6/2013 | Kim et al. |
| 2013/0201852 | A1 | 8/2013 | Chou et al. |
| 2013/0230081 | A1 | 9/2013 | Wernersson et al. |
| 2014/0024386 | A1 | 1/2014 | Novak et al. |
| 2014/0043630 | A1 | 2/2014 | Buser et al. |
| 2014/0050086 | A1 | 2/2014 | Himayat et al. |
| 2014/0056246 | A1 | 2/2014 | Chun et al. |
| 2014/0098900 | A1 | 4/2014 | Bayesteh et al. |
| 2014/0128092 | A1 | 5/2014 | Xiong et al. |
| 2014/0133401 | A1* | 5/2014 | Kaura ........... H04W 36/0022 370/328 |
| 2014/0156646 | A1 | 6/2014 | Brust et al. |
| 2014/0171054 | A1 | 6/2014 | Cai et al. |
| 2014/0177744 | A1 | 6/2014 | Krishnamurthy |
| 2014/0206367 | A1 | 7/2014 | Agee et al. |
| 2014/0211673 | A1 | 7/2014 | Lu et al. |
| 2014/0213259 | A1 | 7/2014 | Teyeb et al. |
| 2014/0288699 | A1 | 9/2014 | Williams et al. |
| 2014/0321313 | A1 | 10/2014 | Seo et al. |
| 2014/0355562 | A1 | 12/2014 | Gao et al. |
| 2015/0003325 | A1 | 1/2015 | Sajadieh et al. |
| 2015/0003326 | A1 | 1/2015 | Zaus |
| 2015/0003338 | A1 | 1/2015 | Xue et al. |
| 2015/0003543 | A1 | 1/2015 | Shirani-mehr et al. |
| 2015/0004980 | A1 | 1/2015 | Vannithamby et al. |
| 2015/0004995 | A1 | 1/2015 | Koc et al. |
| 2015/0056993 | A1* | 2/2015 | Zhu ............. H04W 60/04 455/435.1 |
| 2015/0223197 | A1* | 8/2015 | Kim ............. H04W 8/08 455/458 |
| 2015/0282029 | A1* | 10/2015 | Faccin .......... H04W 36/0022 370/331 |
| 2015/0296354 | A1* | 10/2015 | Liao ............ H04W 4/14 455/466 |
| 2015/0304953 | A1* | 10/2015 | Sun ............. H04W 52/0235 370/311 |
| 2016/0100401 | A1 | 4/2016 | Xiong et al. |

FOREIGN PATENT DOCUMENTS

| | | |
|---|---|---|
| CN | 102948216 A | 2/2013 |
| CN | 104254067 A | 12/2014 |
| CN | 105229934 A | 1/2016 |

(56) References Cited

FOREIGN PATENT DOCUMENTS

| | | | |
|---|---|---|---|
| CN | 105230053 A | 1/2016 | |
| CN | 105247924 A | 1/2016 | |
| CN | 105264788 A | 1/2016 | |
| CN | 105284059 A | 1/2016 | |
| EP | 3014787 A1 | 5/2016 | |
| EP | 3014788 A1 | 5/2016 | |
| EP | 3014790 A1 | 5/2016 | |
| EP | 3014909 A1 | 5/2016 | |
| EP | 3014923 A1 | 5/2016 | |
| JP | 2011259263 A | 12/2012 | |
| KR | 1020130021569 A | 3/2013 | |
| KR | 1020130040749 A | 4/2013 | |
| KR | 1020160003021 A | 1/2016 | |
| TW | 201316712 A | 4/2013 | |
| TW | 201517660 A | 5/2015 | |
| TW | 201635825 A | 10/2016 | |
| WO | WO-2010043752 A1 | 4/2010 | |
| WO | WO-2010088828 A1 | 8/2010 | |
| WO | WO-2010150568 A1 | 12/2010 | |
| WO | WO-2011138495 A1 | 11/2011 | |
| WO | WO-2012000535 A1 | 1/2012 | |
| WO | WO-2013012222 A2 | 1/2013 | |
| WO | WO-2013081377 A1 | 6/2013 | |
| WO | WO-2014158255 A1 | 10/2014 | |
| WO | WO-2014209451 A1 | 12/2014 | |
| WO | WO-2014210441 A1 | 12/2014 | |
| WO | WO-2014210471 A1 | 12/2014 | |
| WO | WO-2014210477 A1 | 12/2014 | |
| WO | WO-2014210493 A1 | 12/2014 | |
| WO | WO-2014210500 A1 | 12/2014 | |

OTHER PUBLICATIONS

"U.S. Appl. No. 14/141,206, Examiner Interview Summary mailed Aug. 26, 2015", 3 pgs.
"U.S. Appl. No. 14/141,206, Non Final Office Action mailed Jan. 7, 2016".
"International Application Serial No. PCT/US2014/031996, International Preliminary Report on Patentability mailed Jan. 7, 2016", 6 pgs.
"International Application Serial No. PCT/US2014/044540, International Preliminary Report on Patentability mailed Jan. 7, 2016", 8 pgs.
"International Application Serial No. PCT/US2014/044592, International Preliminary Report on Patentability mailed Jan. 7, 2016", 7 pgs.
"International Application Serial No. PCT/US2014/044606, International Preliminary Report on Patentability mailed Jan. 7, 2016", 16 pgs.
"International Application Serial No. PCT/US2014/044626, International Preliminary Report on Patentability mailed Jan. 7, 2016", 7 pgs.
"International Application Serial No. PCT/US2014/044640, International Preliminary Report on Patentability mailed Jan. 7, 2016", 8 pgs.
"Taiwanese Application Serial No. 103120032, Response filed Dec. 16, 2015 to Office Action mailed Sep. 23, 2015", W/ English Claims, 17 pgs.
"U.S. Appl. No. 14/109,211, Advisory Action mailed Aug. 22, 2016", 5 pgs.
"U.S. Appl. No. 14/109,211, Final Office Action mailed Jun. 10, 2016", 17 pgs.
"U.S. Appl. No. 14/109,211, Non Final Office Action mailed Sep. 28, 2016", 18 pgs.
"U.S. Appl. No. 14/109,211, Response filed Aug. 5, 2016 to Final Office Action mailed Jun. 10, 2016", 9 pgs.
"U.S. Appl. No. 14/109,211, Response filed Sep. 12, 2016 to Advisory Action mailed Aug. 22, 2016", 9 pgs.
"U.S. Appl. No. 14/109,211,Response filed Mar. 14, 2016 to Non Final Office Action mailed Dec. 14, 2015", 21 pgs.
"U.S. Appl. No. 14/141,206, Final Office Action mailed Aug. 24, 2016", 9 pgs.
"U.S. Appl. No. 14/141,206, Response filed May 6, 2016 to Non Final Office Action mailed Jan. 7, 2016", 11 pgs.
"U.S. Appl. No. 14/141,223, Non Final Office Action mailed Jul. 28, 2016", 18 pgs.
"U.S. Appl. No. 14/141,223, Response filed Oct. 28, 2016 to Non Final Office Action mailed Jul. 28, 2016", 8 pgs.
"Taiwanese Application Serial No. 103121919, Response filed Jun. 20, 2016 to Office Action mailed Dec. 17, 2015", W/ English Translation of Claims, 64 pgs.
"U.S. Appl. No. 14/109,211, Non Final Office Action mailed Dec. 14, 2015", 15 pgs.
"U.S. Appl. No. 14/133,215, Non Final Office Action mailed Oct. 8, 2015", 15 pgs.
"U.S. Appl. No. 14/136,554, Advisory Action mailed Dec. 8, 2015", 3 pgs.
"U.S. Appl. No. 14/136,554, Examiner Interview Summary mailed Dec. 1, 2015", 3 pgs.
"U.S. Appl. No. 14/136,554, Final Office Action mailed Sep. 21, 2015", 12 pgs.
"U.S. Appl. No. 14/136,554, Non Final Office Action mailed Mar. 17, 2015", 11 pgs.
"U.S. Appl. No. 14/136,554, Response filed Jun. 17, 2015 to Non Final Office Action mailed Mar. 17, 2015", 6 pgs.
"U.S. Appl. No. 14/136,554, Response filed Nov. 24, 2015 to Final Office Action mailed Sep. 21, 2015", 6 pgs.
"U.S. Appl. No. 14/141,067, Non Final Office Action mailed Jul. 8, 2015", 9 pgs.
"U.S. Appl. No. 14/141,067, Notice of Allowance mailed Dec. 10, 2015", 9 pgs.
"U.S. Appl. No. 14/141,067,Response filed Oct. 8, 2015 Non Final Office Action mailed Jul. 8, 2015", 9 pgs.
"U.S. Appl. No. 14/141,206, Advisory Action mailed Aug. 19, 2015", 4 pgs.
"U.S. Appl. No. 14/141,206, Examiner Interview Summary filed Sep. 15, 2015", 1 pg.
"U.S. Appl. No. 14/141,206, Final Office Action mailed May 15, 2015", 13 pgs.
"U.S. Appl. No. 14/141,206, Non Final Office Action mailed Dec. 3, 2014", 13 pgs.
"U.S. Appl. No. 14/141,206, Response filed Apr. 2, 2015 to Non Final Office Action mailed Dec. 3, 2014", 12 pgs.
"U.S. Appl. No. 14/141,206, Response filed Aug. 11, 2015 to Final Office Action mailed May 15, 2015", 12 pgs.
"U.S. Appl. No. 14/141,223, Advisory Action mailed Dec. 11, 2015", 4 pgs.
"U.S. Appl. No. 14/141,223, Examiner Interview Summary mailed Dec. 2, 2015", 3 pgs.
"U.S. Appl. No. 14/141,223, Final Office Action mailed Oct. 7, 2015", 19 pgs.
"U.S. Appl. No. 14/141,223, Non Final Office Action mailed Apr. 14, 2015", 18 pgs.
"U.S. Appl. No. 14/141,223, Response filed Aug. 12, 2015 to Non Final Office Action mailed Apr. 14, 2015", 11 pgs.
"U.S. Appl. No. 14/141,223, Response filed Dec. 2, 2015 to Final Office Action mailed Oct. 7, 2015", 8 pgs.
"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.
"Clarification on the scope of ISRP Filter Rule priority", LG Electronics, S2-115168, 3GPP TSG-SA2 Meeting #88, (Nov. 2011), 1-4.
"European Application Serial No. 14171648.0, Extended European Search Report mailed Dec. 22, 2014", 7 pgs.
"European Application Serial No. 14171648.0, Response filed Jul. 17, 2015 Extended European Search Report mailed Dec. 22, 2014", 8 pgs.
"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.

(56) References Cited

OTHER PUBLICATIONS

"Evolved Universal Terrestrial Radio Access (E-UTRA); Multiplexing and channel coding", ETSI TS 136 212 V11.3.0 (3GPP TS 36.212 version 11.3.0 Release 11). LTE., (Jul. 2013), 86 pgs.
"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.
"Evolved Universal Terrestrial Radio Access (E-UTRA); Physical channels and modulation", ETSI TS 136 211 v11.3.0 (3GPP TS 36.211 version 11.3.0 Release 11). LTE, (Jul. 2013), 110 pgs.
"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.
"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.
"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 28-32.
"General Packet Radio Service (GPRS); Service description; Stage 2", 3GPP TS 23.050 V12.1.0. Technical Specification Group Services and System Aspects. Release 12., (Jun. 2013), 338 pgs.
"IEEE Standard for Air Interface for Broadband Wireless Access Systems", IEEE Std 802.16. IEEE Computer Society. IEEE Microwave Theory and Techniques Society., (Aug. 17, 2012), 2544 pgs.
"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.
"International Application Serial No. PCT/US2014/031996, International Search Report mailed Aug. 26, 2014", 3 pgs.
"International Application Serial No. PCT/US2014/031996, Written Opinion mailed Aug. 26, 2014", 4 pgs.
"International Application Serial No. PCT/US2014/044540, International Search Report mailed Oct. 15, 2014", 3 pgs.
"International Application Serial No. PCT/US2014/044540, Written Opinion mailed Oct. 15, 2014", 6 pgs.
"International Application Serial No. PCT/US2014/044592, International Search Report mailed Sep. 29, 2014", 3 pgs.
"International Application Serial No. PCT/US2014/044592, Written Opinion mailed Sep. 29, 2014", 5 pgs.
"International Application Serial No. PCT/US2014/044606, International Search Report mailed Oct. 22, 2014", 3 pgs.
"International Application Serial No. PCT/US2014/044606, Written Opinion mailed Oct. 22, 2014", 6 pgs.
"International Application Serial No. PCT/US2014/044626, International Search Report mailed Oct. 22, 2014", 3 pgs.
"International Application Serial No. PCT/US2014/044626, Written Opinion mailed Oct. 22, 2014", 5 pgs.
"International Application Serial No. PCT/US2014/044640, International Search Report mailed Oct. 21, 2014", 4 pgs.
"International Application Serial No. PCT/US2014/044640, Written Opinion mailed Oct. 21, 2014", 6 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Part 11: Wireless LAN Medium Access Control (MAC) and Physical Layer (PHY) Specifications: Amendment 3: Enhancements for Very High Throughput in the 60 GHz Band", IEEE Std 802.11 ad. Local and metropolitan area networks. IEEE Computer Society., (Dec. 28, 2012), 628 pgs.
"Taiwanese Application Serial No. 103120032, Office Action mailed Sep. 23, 2015", W/ English Translation, 14 pgs.
"Taiwanese Application Serial No. 103121919, Office Action mailed Dec. 17, 2015", 10 pgs.
Delmas, Jean P, "Chapter 4: Subspace Tracking for Signal Processing", Adaptive Signal Processing: Next Generation Solutions, John Wiey & Sons, Inc,, (Jun. 16, 2010), 211-270.
Shirani-Mehr, Hooman, et al., "Practical Downlink Transmission Schemes for Future LTE Systems with Many Base-Station Antennas", IEEE Globecom, (2013), 5 pgs.
Yang, Bang, "Projection approximation subspace tracking", IEEE Transactions on Signal Processing, 43(1), (Jan. 1995), 95-107.
"Chinese Application Serial No. 201410295081.2, Office Action dated Apr. 6, 2017", w/ English Translation, 14 pgs.
"Japanese Application Serial No. 2016-521919, Office Action dated Jan. 31, 2017", W/ English Translation, 4 pgs.
"Korean Application Serial No. 10-2015-7033288, Response filed Feb. 1, 2017 to Office Action dated Dec. 1, 2016", w/ English Claims, 14 pgs.
"Reply LS on UE's inconsistent behaviour when PS Back-off timer is running", 3GPP TSG-CT WG1?83 C1-131808, [Online] retrieved from the internet:<http://www.3gpp.org/ftp/tsg_ct/WG1_mm-cc-sm_ex-CN1/TSGC1_83_Chengdu/docs/C1-131808.zip>, 1 pg. (May 2, 2013).
"Taiwanese Application Serial No. 105119738, Office Action dated Jan. 24, 2017", (English Translation), 23 pgs.
"Taiwanese Application Serial No. 105119738, Response filed May 1, 2017 to Office Action dated Jan. 24, 2017", w/o English Translation, 10 pgs.

\* cited by examiner

RESUMING PACKET SERVICES IN A MOBILE NETWORK

This application is a continuation of U.S. patent application Ser. No. 14/141,67, filed Dec. 26, 2013, which claims the benefit of priority under 35 U.S.C. 119(e) to U.S. Provisional Patent Application Ser. No. 61/841,230, filed on Jun. 28, 2013, each of which is incorporated herein by reference in its entirety.

TECHNICAL FIELD

The disclosure herein relates generally to devices, systems, and/or methods for resuming packet services in a mobile network.

BACKGROUND

In a conventional public land mobile network (PLMN), such as according to the $3^{rd}$ Generation Partnership Project (3GPP), various radio access networks (RANs), such as a General Packet Radio Subsystem Evolved Radio Access Network (GERAN), a Universal Mobile Telecommunications System Terrestrial Radio Access Network (UTRAN), and an Evolved-UTRAN (E-UTRAN) may be connected to a common core network and may provide various and different services. For instance, GERAN or UTRAN may provide voice services, solely or in part. E-UTRAN, by contrast, may provide packet services, either solely or in part.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
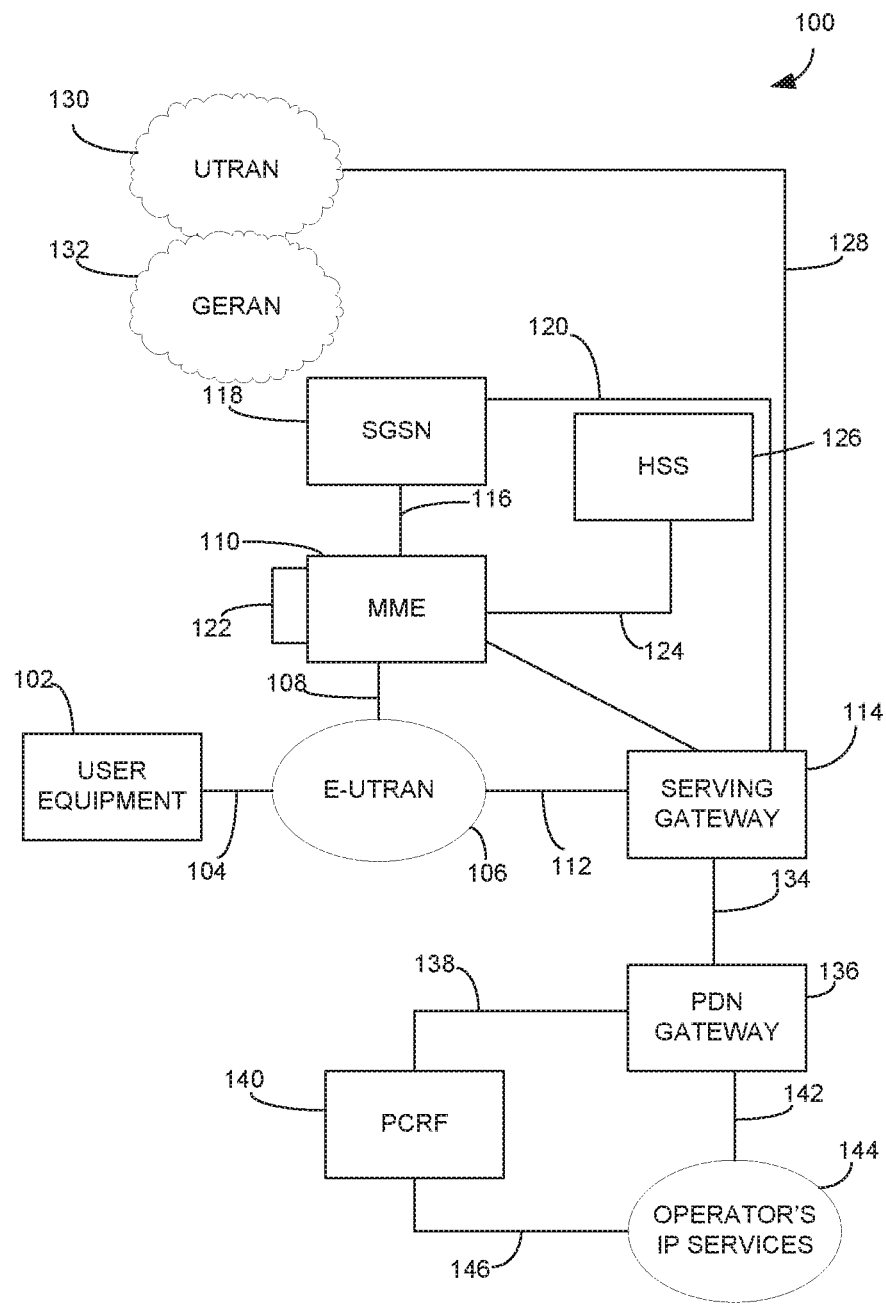
FIG. 1 is a block diagram of a mobile network, in an example embodiment.

FIG. 1 is a block diagram of a mobile network 100, in an example embodiment. In various examples, the mobile network 100 is an evolved packet core network supporting, without limitation, GERAN, UTRAN, and/or E-UTRAN. It is to be understood that, while various components may be the particular elements as illustrated, the components may be replaced with similar or suitable components for various related mobile networks and mobile network environments.

User equipment 102 (as noted, also referred to as a Mobile Station (MS)) is communicatively coupled via a radio interface 104 (e.g., Long Term Evolution (LTE-Uu)) to an E-UTRAN 106 system. The E-UTRAN 106 may be communicatively coupled via a S1-MME (Mobility Management Entity) link 108 to a MME 110 and via a S1-U link 112 to a Serving Gateway 114. The MME 110 may be directly connected to the Serving Gateway 114 via an S11 link 115 and may be connected via a S3 link 116 to a Serving General Packet Radio Subsystem Support Node (SGSN) 118, which is itself connected via an S4 link 120 to the Serving Gateway 114. The MME 110 may include an internal S10 link 122 and an S6a link 124 to a High Speed Serial (HSS) interface node 126.

The Serving Gateway 114 may be connected via an S12 link 128 to one or more UTRAN 130 and GERAN 132 networks. The Serving Gateway 114 may further be connected via an S5 link 134 to a public data network (PDN) gateway 136. The PDN gateway 136 may be connected via a link 138 to a policy and changing rules function (PCRF) node 140 and via a SGi link 142 to an operator's IP services 144, such as an IP Multimedia Subsystem (IMS). The PCRF node 140 may be connected to the operator's IP services 144 via a link 146.

Figure 2:
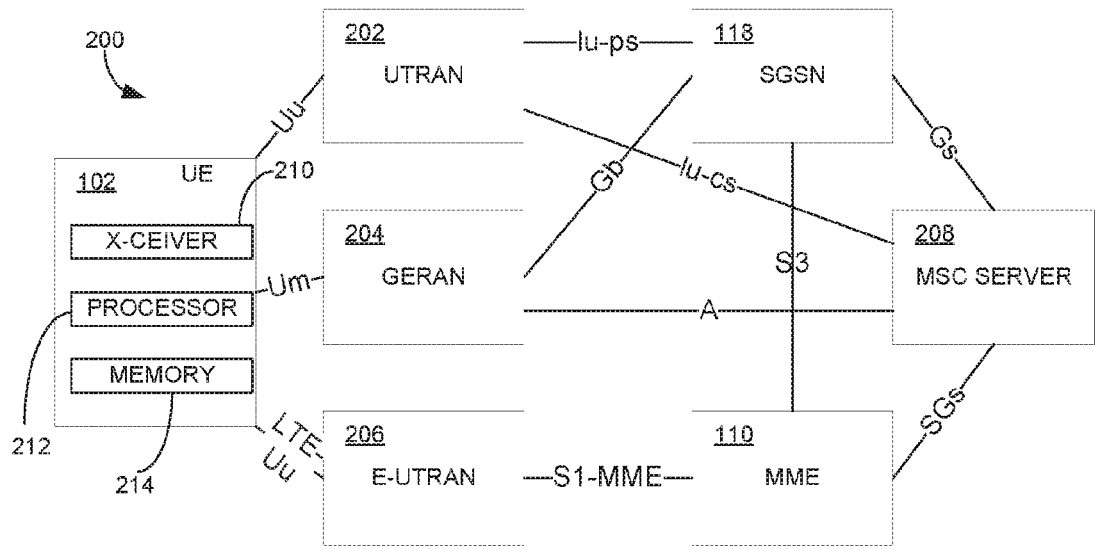
FIG. 2 is a block diagram of a mobile network architecture for circuit-switched fallback, in an example embodiment.

FIG. 2 is a block diagram of a mobile network architecture 200 for circuit-switched fallback, in an example embodiment. The architecture 200 may operate with respect to the mobile network 100 or any suitable mobile network.

The UE 102 is communicatively coupled or coupleable to a UTRAN cell 202, a GERAN cell 204, and an E-UTRAN cell 206. The UTRAN cell 202 and the GERAN cell 204 are coupled or coupleable to the SGSN 118 and mobile switching center (MSC) server 208. The E-UTRAN cell 206 is coupled or coupleable to the MME 110. The MME 110 is coupled or coupleable to the SGSN 118 and the MSC server 208.

The GERAN 132 and UTRAN 130 RANs may be connected to a circuit-switched (CS) domain of the network 100, such as may be embodied in the architecture 200. For circumstances in which UE 102 is in or is communicating via the E-UTRAN 206 cell when the subscriber wants to setup a CS voice call, the mobile network 100 may include a CS fallback (CSFB). In CSFB, the UE 102 in the E-UTRAN 206 cell may signal to the core network 100 that it wants to set up a CS call or that the UE 102 wants to respond to a paging for a CS call. The mobile network 100 and/or the architecture 200 may the redirect the UE 102 to a GERAN 204 or UTRAN 202 cell, such as via a packet-switched (PS) handover, via a "release with redirection" procedure, or via a network-assisted cell change over (CCO). In such examples, the UE 102 can set up the mobile originating call or receive the mobile terminating call via the MSC server 208. Once the CS call is released in GERAN 204 and/or UTRAN 202 cells, the UE 102 may return to the E-UTRAN cell 206 either on its own (e.g., via cell reselection) or with the help of the GERAN and/or UTRAN (e.g., if, during the release of the radio connection for the CS call the GERAN 204 and/or UTRAN 202 cells commands the UE 102 to immediately select a specific E-UTRAN cell 206).

During the CS call, if the UE 102 is in a GERAN cell 204 and the UE 102 or the GERAN cell 204 is not supporting the simultaneous use of CS services and packet services (e.g., because a dual transfer mode (DTM) feature is not present or not supported), then the network 100 and/or the architecture 200 may suspend packets services for the UE 102. In such a circumstance, downlink packets may not be delivered to the UE 102 but may be forwarded by a packet data network gateway (PDN-GW) toward the UE 102, potentially unnecessarily consuming network 100 and/or architecture 200 resources. In an example, the UE 102 and/or one of the core network nodes (e.g., the MME 110 and/or the SGSN 118, as appropriate) may inform a serving gateway (S-GW) and/or the PDN-GW that the gateways should no longer forward downlink user packets from the UE 102. Additionally or alternatively, the MME 110 or SGSN 118 may deactivate dedicated packet bearers which are used for real-time services. Such services may require that user data packets are delivered within a relatively short time.

When the CS call is released or when, during the CS call the UE 102 is handed over to a cell where CS services and packet services can be used simultaneously, the UE 102 or the network 100 and/or architecture 200 may signal to the S-GW and/or the PDN-GW that the gateways may resume packet services (e.g., the gateways may resume forwarding downlink user plane packets form the user device 102).

In various examples, for signaling to suspend the packet services while the UE 102 is in a GERAN cell 204 a standard for the mobile network 100, such as the 3GPP standard, may provide two procedures: suspension initiated by the MME 110 and suspension initiated by the UE 102 (e.g., via the SGSN 118). The procedures may include variants dependent, e.g., on whether the CSFB was performed to a GERAN 204 or a UTRAN 202 target cell, whether the CSFB was performed via PS handover or via release with redirection or CCO, whether an idle mode signaling reduction (ISR) was activated before the CSFB, and whether the SGSN 118 serving the GERAN cell 204 and/or the UTRAN cell 202 is the SGSN 118 to which the UE 102 is registered.

Correspondingly, there are two different procedures to resume packet services when the UE 102 returns to the E-UTRAN cell 206, one using signaling via the MME 110 and one using signaling via the SGSN 118. However, due to multiple potential scenarios by which reconnection may happen, there are cases in which both primary resumption procedures of the 3GPP standard may fail in resuming packet services. In such cases, the packet services may remain suspended and the UE 102 may remain unreachable for mobile terminated packet services. For instance, if the UE 102 is registered for an IP multimedia subsystem (IMS) other than VoLTE, e.g., IMS messaging or short message service (SMS) over internet protocol (IP), a mobile terminated instant message or short message may not be delivered to the UE 102 because the signaling for such services may utilize session initiation protocol (SIP) and the packet bearer used to transfer the Sip signaling messages has been suspended.

The UE 102 includes a wireless transceiver 210, a processor 212, and electronic memory 214 including a register. The transceiver is configured to communicate with the UTRAN cell 202, the GERAN cell 204, and the E-UTRAN cell 206. The processor 212 is configured to control, at least in part, an operation of the UE 102 generally and the components 210, 214 thereof. The processor 212 may be a microprocessor, a controller, or other dedicated hardware, as known in the art. The electronic memory 214 may be or include registers implemented according to any of a variety of electronic memory or other technologies suitable for implementing data registers known in the art.

Figure 3:
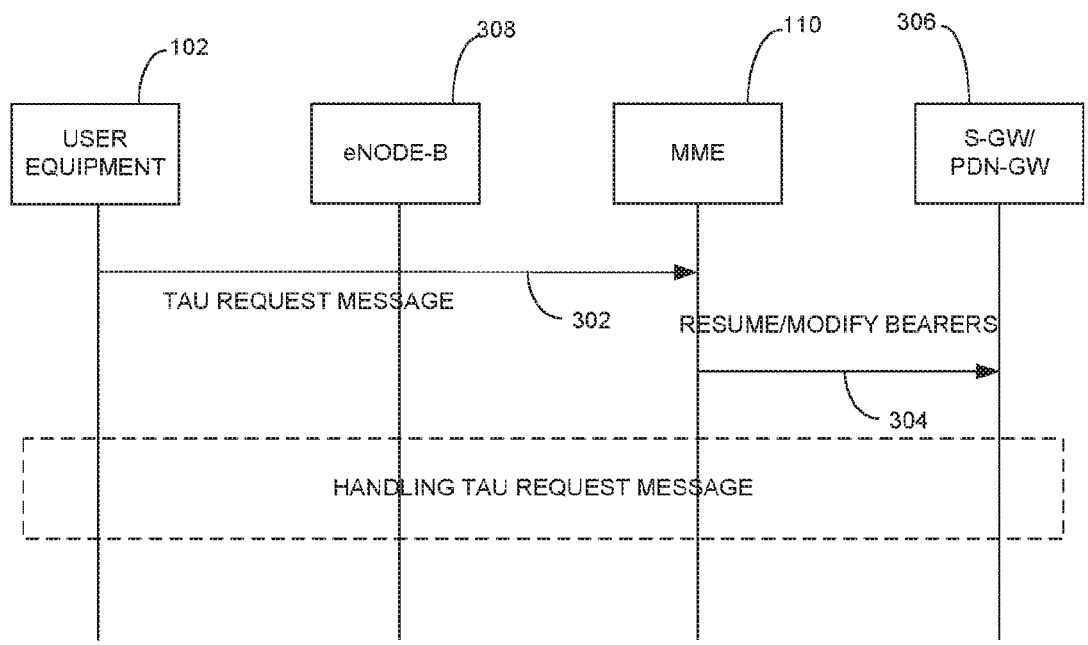
FIG. 3 is a data flow showing the resumption of data packets via the MME, in an example embodiment.

FIG. 3 is a data flow 300 showing the resumption of data packets via the MME 110, in an example embodiment. Resumption of packet services may occur via the MME 110, as noted above. When the UE 102 returns to the E-UTRAN 206 and packet services were suspended during the CS call, then the UE 102 may perform a combined tracking area updating procedure by sending a tracking area update (TAU) request message 302 to the MME 110 (see, e.g., TS 23.272, subclauses 6.5 and 7.6, and TS 24.301, subclauses 5.5.3.2.2). In circumstances where the TAU request message 302 to the MME 110 initiates a resume/modify bearers message 304 towards the S-GW 306, the S-GW may interpret this as an implicit resume and may inform the PDN-GW accordingly (see, e.g., TS 23.401, subclause 5.3.3.2, steps 9 and 13).

In various cases, the UE 102 context in the MME 110 is not marked as "suspended" and the MME 110 also does not initiate any TAU-related signaling towards the S-GW 306 or the SGSN 118. The MME 110 may, in certain examples, mark the UE 102 context as "suspended" if, and in some circumstances only if, the CSFB is performed via release with redirection or CCO (e.g., no via PS handover) and the eNode-B 308 indicates to the MME 110 that in the target cell the UE 102 is not available for packet services. In such circumstances, the target cell for the CSFB may be a GERAN cell 204 and one or more of the UE 102 and the GERAN cell 204 are not supporting dual transfer mode (DTM). As a result, if the CSFB is performed via PS handover or if the target cell is a UTRAN cell 202 the MME 110 will not mark the UE 102 context as suspended.

In an example, if ISR has been activated and the UE 102 sends the TAU request message 302 to the MME 110 to which the UE 102 is already registered, then the MME 110 may not initiate any TAU-related signaling toward he S-GW 306 and/or the SGSN 118. Overall, if the CSFB is performed via PS handover or if the target cell is a UTRAN cell 202, and if ISR remains activated during the CS call and, after release of the call, the UE 102 returns to the same MME 110, the resume via the MME 110 may not work according to conventional mobile network 100 protocols.

In an example, the mobile network 100 includes a protocol such that in various examples, when the UE returns to E-UTRAN and packet services were suspended during the CS call, then the UE may perform a combined TAU procedure by sending a TAU request message to the MME 110 (FIG. 3; see, also, TS 232.272, subclauses 6.5 and 7.6, and TS 24.301, subclause 5.5.3.2.2). In an example, before the UE initiates the combined TAU procedure (e.g., before the UE 102 formats the TAU request message), the UE 102 may deactivate ISR locally, e.g., if the value of the UE 102 internal control parameter Temporary Identity used in Next update (TIN) is "RAT-related", then the UE 102 may change the value to "P-Temporary Mobile Subscriber Identity" (P-TMSI).

In various examples, if the TIN is set to P-TMSI, the UE 102 populates the contents of the TAU request message so as to cause the MME 110 to initiate TAU-related signaling toward the SGSN 118 and the S-GW 306, thus resuming packet services. In an example, the UE 102 does not perform the local deactivation of ISR (e.g., for resumption of packet services) if the UE 102 can assume that the MME 110 marked in the UE 102 context as suspended, such as if the target cell of the CSFB procedure was a GERAN cell 204 and the CSFB was performed by a release with redirection or CCO.

Referring to the packet flow 300, if the UE 102 sets the TIN to P-TMSI before sending the TAU request message 302, then the UE 102 populates an globally unique temporary identity (GUTI) information element in the TAU request message 302 with a GUIT mapped from a P-TMSI and the related RAI. This may cause or force the MME 110 to exchange signaling message with the SGSN 118 (e.g., an "old" SGSN 118, such as a 3G SGSN, as disclosed herein; see, also, TS 23.401, subclause 5.3.3.2, steps 4, 5, and 7; context request, context response, and context acknowledge) and with the S-GW 306 (Id, steps 9 and 13, modify bearer request and modify bearer response). When the S-GW 306 receives the modify bearer request or modify access bearer request message, then the S-GW 306 may interpret such requests as an implicit request to resume packet services and may inform the PDN-GW accordingly. During TAU signaling, the MME 110 can immediately re-establish ISR with the UE 102, the old SGSN 118 (e.g., the 3G SGSN), and the S-GW 306.

In various examples, ISR may not be activated for a UE 102 registering for CSFB. In various examples, base station controller (BSC) behavior may be modified. In such an example, if the GPRS resume was not successful, then the BSC could avoid including redirection information to E-UTRAN in a channel release message (disclosed herein). The UE 102 may remain on the GERAN cell 204 and have the opportunity to perform a routing area update procedure to resume packet services. In an example, the MME 110 behavior may be modified, such as, in an network supporting GERAN, when the UE 102 performs CSFB, the MME 110 may mark the UE 102 context as suspended.

In various examples, the mobile network 100 may avoid circumstances of other networks in which packets services may not be resumed, though the UE 102 may perform a TAU procedure. The mobile network 100 may include elements of conventional networks operating according to conventional standards and certain conventional protocols. The mobile network 100 may include three (3) additional messages exchanged between the MME 110 and the SGSN 118. However, the additional messages may be limited to circumstances where the UE 102 actually suspended packet services during the CSFB and where IRS is activated (e.g., if there is no GERAN connected to the core network or if the PLMN does not activate ISR, packet services may not be suspended anyway). The additional signal may further be limited to cases where the MME 110 did not mark the UE 102 context as suspended.

Figure 4:
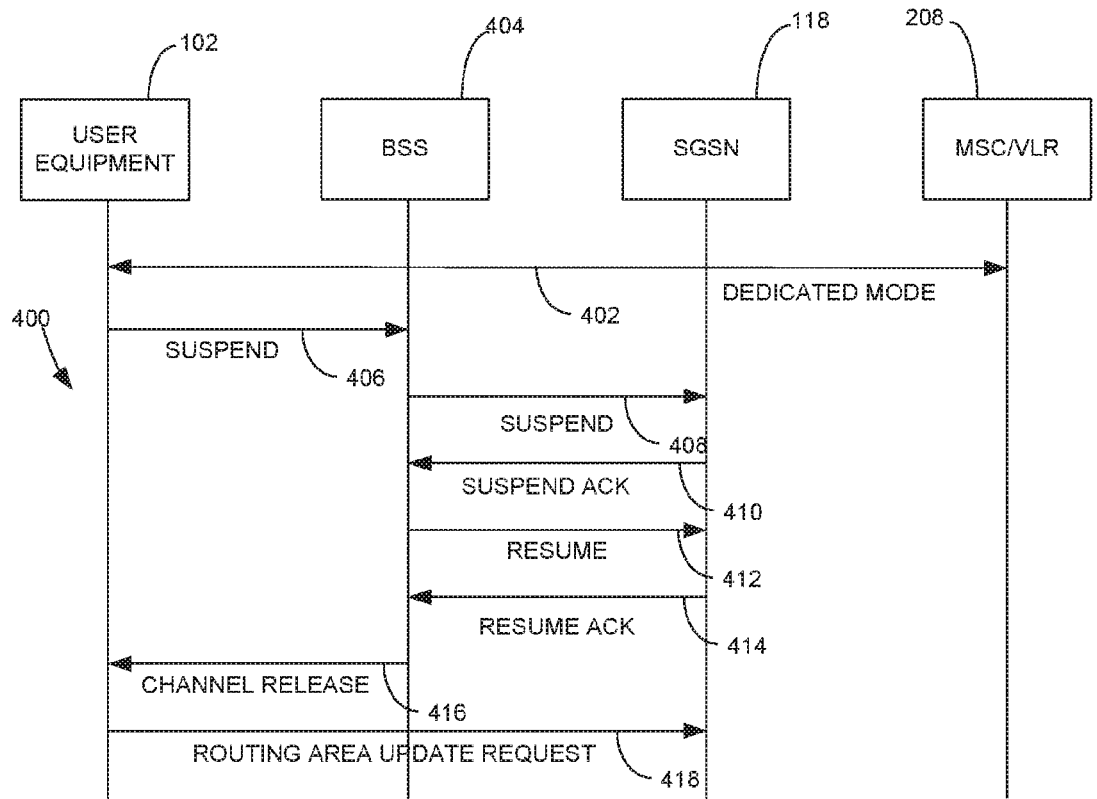
FIG. 4 is a data flow showing a suspend and resume procedure for intra-SGSN communication, in an example embodiment.

FIG. 4 is a data flow 400 showing a suspend and resume procedure for intra-SGSN 118 communication, in an example embodiment. The data flow 400 may be implemented by the network 100 or by a network that does not necessarily include the protocols described herein with respect to the network 100.

A dedicated mode 402 may be established between the UE 102, a base station subsystem (BSS) 404, the SGSN 118, and the MSC 208. The UE 102 may transmit a suspend message 406 to the BSS 404. The BSS 404 may transmit a suspend message 408 to the SGSN 118. The SGSN 118 may reply with a suspend acknowledgement message 410. Upon initiation of a resumption procedure, the BSS 404 may transmit a resume message 412 to the SGSN 118. The SGSN 118 may reply with a resume acknowledgement message 414. The BSS 404 may transmit a channel release message 416 to the UE 102, which may then transmit a routing area update request 418 to the SGSN 118.

If the target cell for the CSFB is a GERAN cell 204 and the UE 102 and the GERAN cell 204 do not support DTM, the UE 102 may initiate a suspend procedure to the SGSN 118, as detailed above. If ISR is activated, then either the SGSN 118 receiving the suspend message 408 from the BSS 404 initiates a suspend procedure toward the S-GW and/or the PDN-GW 306 or, if the UE 102 is registered to a different SGSN 118 (e.g., a previously registered SGSN 118), the SGSN 118 may forward the suspend request to the previous SGSN 118 which may then initiate the suspended procedure towards the S-GW and/or the PDN-GW 306 (see, e.g., TS 23.272 subclauses 6.2, step 3c, and subclause 6.3, steps 7 and 8). In various examples, when ISR is activated the MME 110 is not informed by the SGSN 118 or the S-GW 306 that the packet bearers have been suspended. The UE 102 may initiate a suspend procedure, as detailed above, toward the SGSN 118 also if, later during the CSFB call the UE 102 performs a handover to a GERAN cell 204 and the UE 102 or the GERAN cell 204 do not support DTM.

In various examples, after termination of the CS call the UE 102 may resume PS services (e.g., according to TS 23.060). In various examples, if the UE 102 remains on UTRAN/GERAN after the CS voice call is terminated the UE 102 may perform normal mobility management procedures (e.g., as defined in TS 23.060 [3] and TS 24.008 [21]). In certain examples, resuming PS services may not occur according to BSS-SGSN signaling and the UE may not initiate normal mobility management procedures in GERAN/UTRAN.

For instance, if intra-SGSN was suspended due to a CS inter-system handover (e.g., handover of a CS call from UTRAN to GERAN, after CSFB from E-UTRAN to UTRAN via. PS handover), then the resume via BSS-SGSN signaling may not occur or may not, in certain circumstances, be possible due to the change of a radio system s e, e.g., TS 23.060, subclause 16.2.1.2.1).

Figure 5:
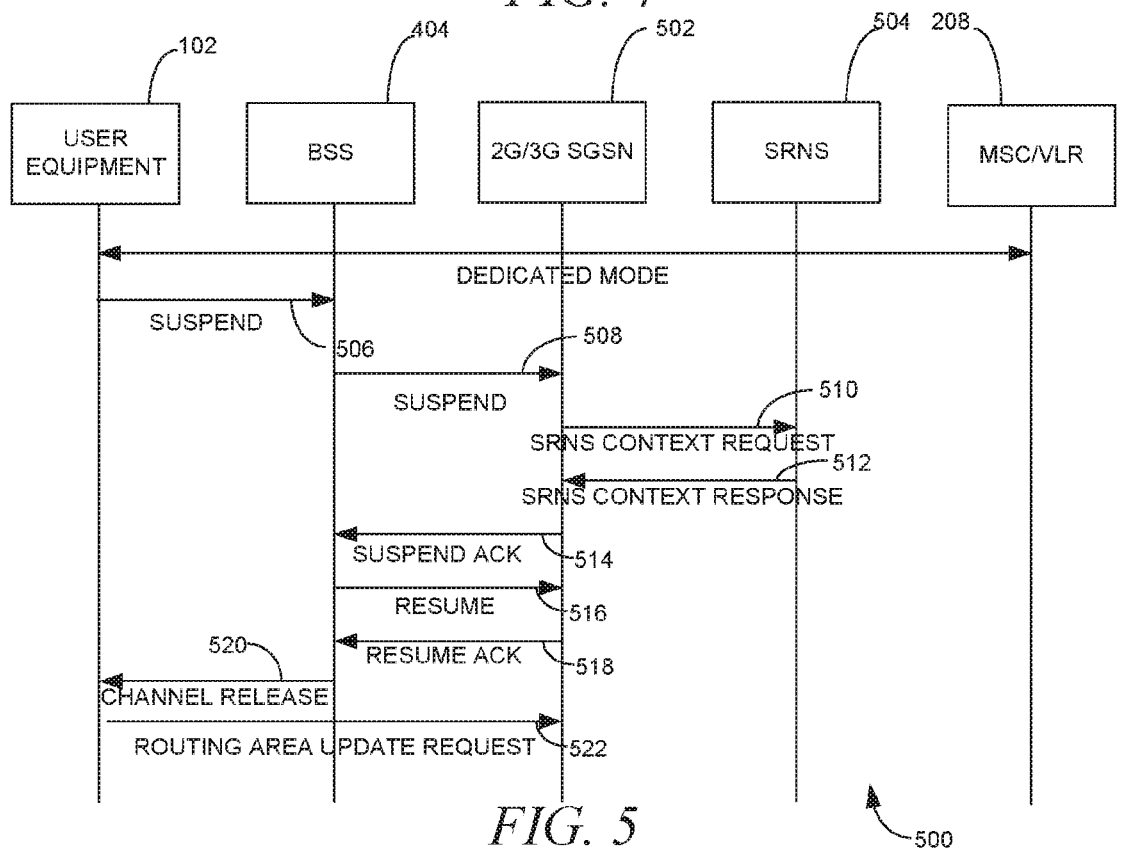
FIG. 5 is a data flow for a combined 2G/3G SGSN serving both a GERAN cell and a UTRAN cell, in an example embodiment.

FIG. 5 is a data flow 500 for a combined 2G/3G SGSN 502 serving both a GERAN cell 204 and a UTRAN cell 202, in an example embodiment. The data flow 500 may be implemented by the network 100 or by a network that does not necessarily include the protocols described herein with respect to the network 100.

An intersystem handover message 504 may be exchanged between and among the UE 102, the BSS 404, the 2G/3G SGSN 502, a serving radio network subsystem 504 (SRNS, e.g., a base station subsystem equivalent for UTRAN), and the MSC 208. The UE 102 may send a suspend message 506 to the BSS 404. The BSS 404 may transmit a suspend message 508 to the 2G/3G SGSN 502. The SGSN 502 may forward an SRNS context request 510 to the SRNS 504. The SRNS 504 may transmit an SRNS context response 512 to the SGSN 502. The SGSN 502 may transmit a suspend acknowledgement message 514 to the BSS 404. The BSS 404 may transmit a resume message 516 to the SGSN 502. In the illustrated example, the SGSN 502 may reply with a resume non-acknowledgement message 518. The BSS 404 may transmit a channel release message 520 to the UE 102. The UE 102 may transmit a routing area update request 522 to the SGSN 502.

Thus, the resume message 516 and the resume non-acknowledgement message 518 may cause the UE 102 to initiate a routing area update request procedure to resume packet services. However, in certain circumstances, when the channel release message includes a cell selection indicator after release of some or all TCH and SDCCH information elements which may command the UE 102 to select an E-UTRAN cell, then the UE 102 may not be able to initiate the routing area updating procedure to resume packet services, even if the channel release message 520 does not include an indication that a general packet radio subsystem (GPRS) resumption was successful.

Figure 6:
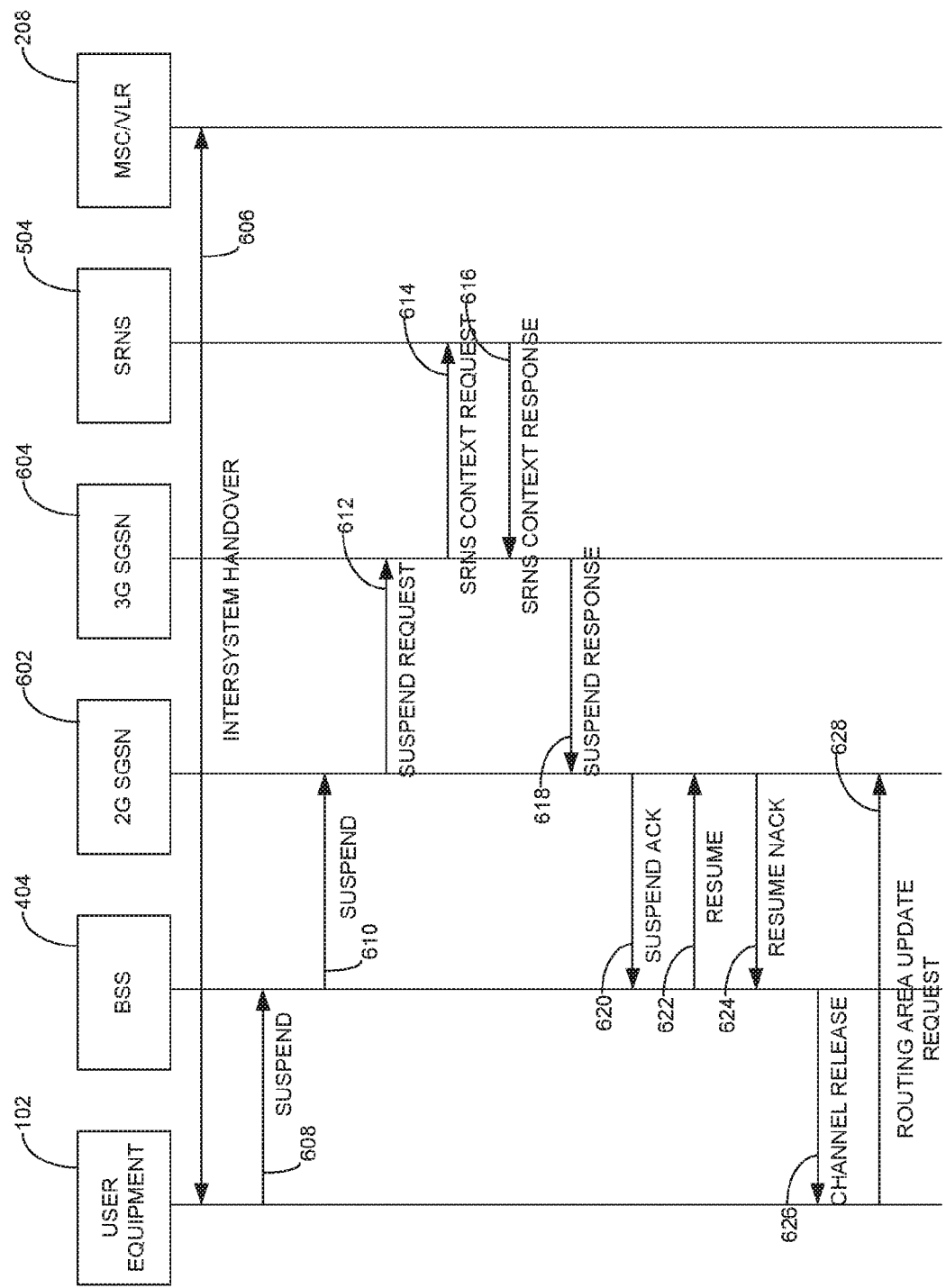
FIG. 6 is a message flow for a dedicated 2G SGSN and a dedicated 3G SGSN serving the GERAN cells and the UTRAN cells, respectively, in an example embodiment.

FIG. 6 is a message flow 600 for a dedicated 2G SGSN 602 and a dedicated 3G SGSN 604 serving the GERAN cells 204 and the UTRAN cells 202, respectively, in an example embodiment. Thus, while the message flow 500 of FIG. 5 is applicable for the combined 2G/3G SGSN 502, the message flow 600 may be applicable to separate and dedicated SGSNs 118 (see. e.g., TS 23.060, subclause 16.2.1.2.2). The data flow 600 may be implemented by the network 100 or by a network that does not necessarily include the protocols described herein with respect to the network 100.

In the illustrated example, the UE 102, the BSS 404, the 2G SGSN 602, the 3G SGSN 604, the SRNS 504, and the MSC 208 communicate according to an intersystem handover message 606. The UE 102 transmits a suspend message 608 to the BSS 404. The BSS 404 transmits a suspend message 610 to the 2G SGSN 602. The 2G SGSN 602 transmits a suspend request message 612 to the 3G SGSN 604. The 3G SGSN 604 transmits a SRNS context request message 614 to the SRNS 504. The SRNS 504 transmits a SRNS context response message 616 to the 3G SGNS 604. The 3G SGSN 604 transmits a suspend response message 618 to the 2G SGSN 602. The 2G SGSN 602 transmits a suspend acknowledge message 620 to the BSS 404. The BSS 404 then transmits a resume message 622 to the 2G SGSN 602. The 2G SGSN 602 transmits a suspend non-acknowledge message 624 to the BSS 404. The BSS 404 transmits a channel release message 626 to the UE 102. The UE 102 transmits a routing area update request 628 to the 2G SGSN 602.

In the above example, the 3G SGSN 604 may be an established or first SGSN 118, e.g., the UE 102 is registered to the 3G SGSN 604 and to the MME 110 (e.g., as ISR is activated), and the CSFB target cell is a UTRAN cell 202 served by the 3G SGSN 604. During the CS call the UE 102 may perform CS inter-system handover from UTRAN to GERAN and the suspend message 608, 610 may be received by the 2G SGSN 602. In various examples, if the resume via SGSN 118 involves an inter-RAT change or if more than one SGSN 118 is involved, and if the network 100 performs a release with immediate redirection to E-UTRAN, then the resume via an SGSN 118 may not work.

In an example scenario referring to FIG. 2 and according to one or more of the message flows 300, 400, 500, 600, the UE 102 is in the E-UTRAIN cell 206. The UE 102 registered to the MME 110 and to the SGSN 118 and ISR is activated. The UE 102 sends an extended service request message to the MME 110 to initiate a CSFB call or to respond to paging for an CSFB call. The network 100 and/or the architecture 200 performs CSFB to a UTRAN target cell 202. The UE 102 may be available for PS services in the UTRAN target cell 202. In such a circumstance, the MME 110 may not mark the UE 102 context as suspended.

The UTRAN target cell 202 may be served by the SGSN 118 and below to a registered routing area identity (RAI). In such an example, the UE 102 may not initiate a routing area updating procedure. The ISR may remain activated. In various examples, if the RAI changes due to the CSFB the UE 102 may perform a normal routing area update even if a network mode of operation (NMO) is NMO I; in such an example, ISR may remain activated if the SGSN 118 does not change.

During a CS call, the UE may perform a CS handover to the GERAN cell 204 not supporting DTM. The UE 102 may initiate a suspend procedure. If the GERAN cell 204 is served by a 2G/3G SGSN 502 the 2G/3G SGSN 502 may initiate suspension of the packet bearers toward the S-GW/PDN-GW 306. If the GERAN cell 204 is served by a different SGSN 118 (e.g., a 2G SGSN 602), the SGSN 118 may forward the suspend request to the 2G/3G SGSN 502, which may initiate the suspension of the packet bearers toward the S-GW/PDN-GW 306. In such circumstances, the MME 1120 may not be informed about the suspension.

When the CS call is released, the MSC server 208 informs a BSC of the BSS 404 that the call was initiated as a CSFB call, e.g., by providing a CSFB indication. The BSC may utilize this information and includes in the channel release message an indication to select an E-UTRAN cell 206. The indication may be to immediately select the E-UTRAN cell 206. Before sending the channel release message to the UE 102, the BSC may send the resume message to the SGSN 118, but due to the inter-RAT change (e.g., after PS handover to the UTRAN target cell 202), the resume may not be possible and the SGSN 118 may respond with a resume non-acknowledge message. Thus, the BSC may initiate in the channel release message also that GPRS resumption was not successful. In various examples, if the GERAN cell 204 is served by a 2G SGSN 602 different from the 3G SGSN 604, the 2G SGSN 602 may not forward the suspend request to the 3G SGSN 604 but may respond with the resume non-acknowledge message.

The UE 102 may receive the channel release message. A radio resource (RR) control of the UE 102 may react to the cell selection information and trigger selection of the E-UTRAN cell 206. Additionally, the RR may inform a GPRS mobility manager (GMM) in the UE 102 that GPRS resumption was not successful. Because the UE 102 may not be in the UTRAN/GERAN cells 202, 204, GMM may not initiate a routing area updating procedure to resume packet services. Instead, the UE 102 may initiate a tracking area updating procedure. ISR may still be activated in the UE 102.

The TAU request message may be received by the same MME 110 to which the UE 102 was registered. As ISR may still be activated and the UE 102 context may not have been marked as suspended, the MME 110 may only send a TAU accept message to the UE 102 but may not initiate any or substantially any signaling toward the 3G SGSN 604 or the S-GW 306. The packet services may thus remain suspended. A periodic tracking area update or other tracking area update during which IRS remains activated does not result in a resumption of the packet services. In such circumstances, the UE 102 may remain unreachable for a longer time. Conversely, a routing area update or a service request via E-UTRAN, e.g., if the UE 102 wants to transmit uplink user data, may result in a resumption of packets services.

The failures to resume packet services detailed herein may not be applicable to the mobile network 100 that implements the protocols described herein (e.g., with respect to FIG. 3 above). In particular, the mobile network 100 may include the protocol to deactivate ISR locally described herein. Thus, the mobile network 100 may resume packet services in the circumstances described herein in which the network 100 or other networks that do not deactivate ISR according to the protocol described herein may not resume packet services.

Figure 7:
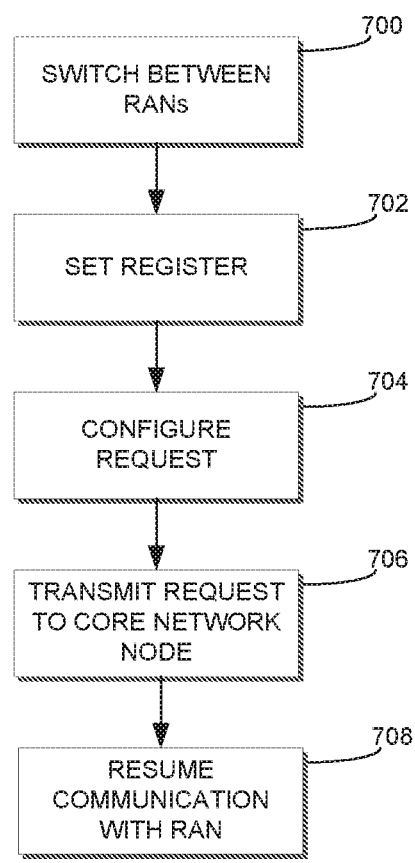
FIG. 7 is a flowchart for storing radio access technology information, in an example embodiment.

FIG. 7 is a flowchart for storing radio access technology information, in an example embodiment. The flowchart may be used with respect to the mobile network 100 or any other suitable network or system.

At 700, user equipment, such as a transceiver of the user equipment, is switched from communicating with a first radio access network to communicating with a second radio access network.

At 702, a register of the user equipment is set, with the processor of the user equipment, to initiate packet services with the first radio access network. In an example, the register is a temporary identity register configured to provide an identity of the user equipment for reconnecting with the first radio access network. In an example, setting the register to initiate packet services is based, at least in part, on an initial setting of the register being based on a radio access technology. In an example, the user equipment and the first radio access network are configured to communicate according to the radio access technology. In an example, setting the register to initiate packet services is not performed if the second radio access network is at least one of a global system for mobile communications (GSM) radio access network and at least one of the switching was a release with redirection a cell change order.

At 704, the processor of the user equipment configures the request based on the register and a protocol.

At 706, a request is transmitted with the user equipment to a core network node of the first radio access network to resume communications with the first radio access network based, at least in part, on the register. In an example, the request is based, at least in part, on a geographic characteristic of the mobile network. In an example, the geographic characteristic of the mobile network is a tracking area of the network and wherein the request is a request to perform a tracking area update procedure with the first radio access network.

At 708, communication is resumed with the first radio access network is based, at least in part, on packet services. In an example, resuming communication with the first radio access network is based, at least in part, on packet services.

Figure 8:
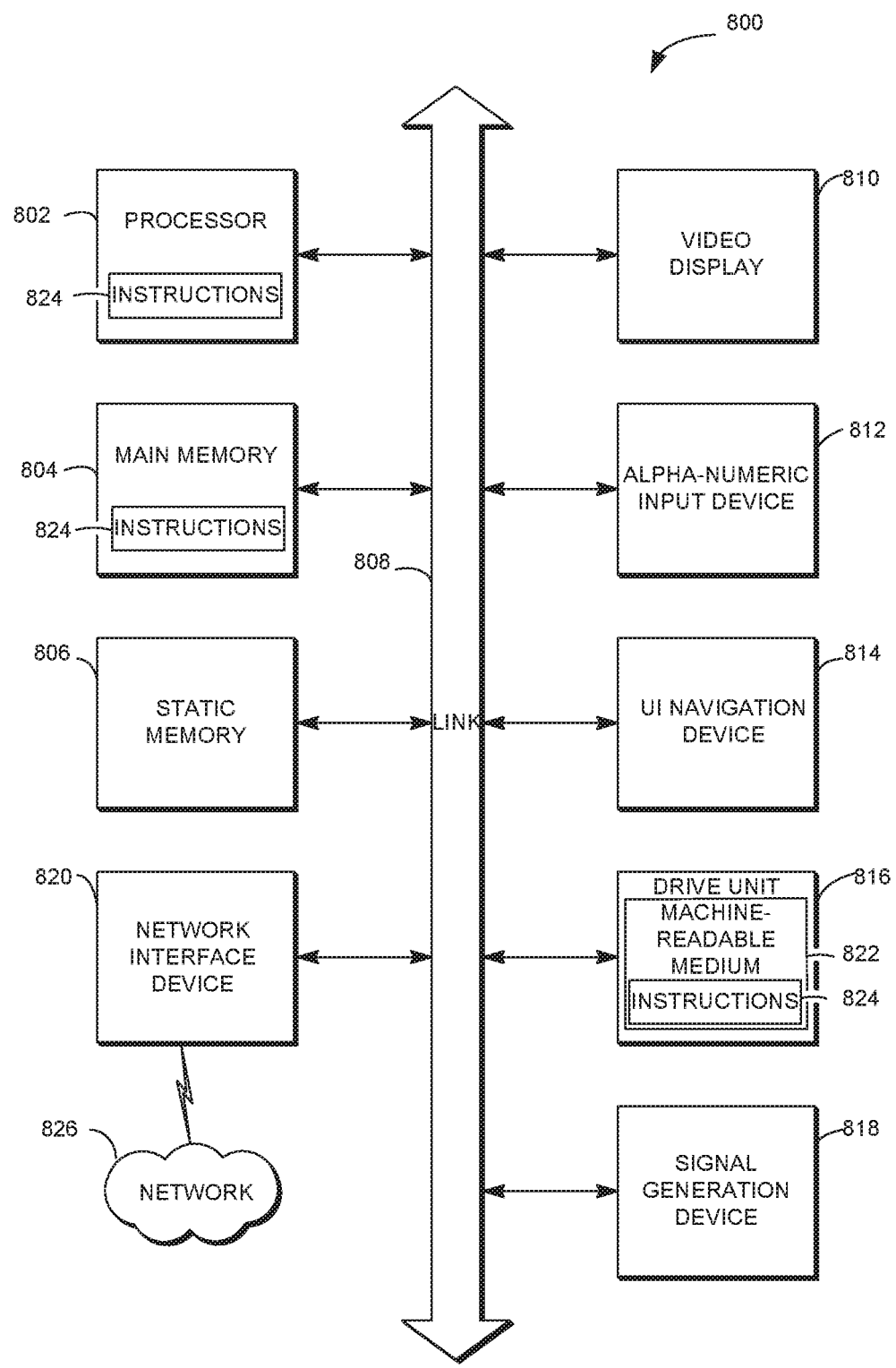
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820. The network interface device 820 may be a wired transceiver or a wireless transceiver, including one or more transceivers that may be utilized in a cellular or mobile network, such as the mobile network 100.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as afield programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A user equipment (UE) configured for inter-RAT mobility, the UE comprising:
a transceiver coupled to a processor, the transceiver and processor, configured to:
receive signaling to activate idle mode signal reduction (ISR) for subsequent use during inter-RAT cell reselection while the UE is in idle mode;
perform inter-RAT cell reselection in accordance with ISR when ISR is activated, the inter-RAT cell reselection to establish a circuit-switched (CS) radio signaling connection within a target cell when the target cell is a non-E-UTRAN cell;
transmit signaling to suspend packet switched (PS) services while the UE has a signaling connection within a non-E-UTRAN cell;
transmit signaling to initiate a tracking area update (TAU) procedure when ISR is activated to resume PS services when the UE returns to a E-UTRAN cell; and
based on an unsuccessful resumption of PS services, deactivate ISR after returning to the E-UTRAN cell prior to initiating another TAU procedure to resume PS services.

2. The UE of claim 1 wherein the UE is configured to deactivate ISR locally by setting a temporary identity used in next update (TIN) parameter of the UE to a value indicating a Packet-Temporary Mobile Scriber Identity (P-TMSI) before initiating the TAU procedure,
wherein the P-TMSI refers to a RAT with which the UE was established before the inter-RAT cell reselection.

3. The UE of claim 2 further comprising a register, wherein the register is configured to store the P-TMSI.

4. The UE of claim 2 wherein to perform the inter-RAT cell reselection in accordance with ISR, the UE is configured to refrain from initiating a routing area update (RAU) procedure when reselecting a GERAN cell of a routing area corresponding to a routing area identification that was stored by the UE during a last RAU procedure and a temporary identity used in next update (TIN) parameter of the UE is set to a value indicating a RAT-related Temporary Mobile Scriber Identity (TMSI).

5. The UE of claim 4 wherein the signaling to activate ISR is received in a RAU or TAU accept message as part of a RAU or TAU procedure.

6. The UE of claim 5 wherein the signaling to resume the PS services when the UE returns to a E-UTRAN cell is initiated by a TAU request message sent to a MME.

7. The UE of claim 4 wherein when the non-E-UTRAN target cell is a GERAN cell, the UE is configured to, the UE is further configured to initiate CS call in the GERAN cell,
wherein when the UE does not support dual-transfer mode (DTM) comprising simultaneous use of CS services and PS services, the UE is configured to transmit signaling to suspend PS services for the UE.

8. The UE of claim 4 wherein the signaling to suspend PS services while the UE has a signaling connection within a non-E-UTRAN cell comprises a suspend request,
wherein prior to transmission of the suspend request, the UE is configured to transmit an extended service request message in a E-UTRAN cell to initiate a circuit-switched fallback (CSFB) call,
wherein transmission of the suspend request depends on whether the CSFB call is performed to a GERAN or a UTRAN target cell, and
information conveyed by the suspend request depends on whether the ISR was activated before the CSFB call.

9. The UE of claim 4 wherein the UE is configured to deactivate ISR after returning to the E-UTRAN cell when PS services were not resumed successfully prior to initiating a TAU procedure to resume PS services.

10. The UE of claim 2 wherein the non-E-UTRAN target cell is either a UTRAN cell or a GERAN cell.

11. The UE of claim 10 wherein when the non-E-UTRAN target cell is a GERAN cell, the UE is configured to transmit signaling to suspend the PS services while the UE is in dedicated mode and has a radio-resource (RR) signaling connection within the GERAN cell.

12. The UE of claim 2 wherein the non-E-UTRAN target cell and the non-E-UTRAN cell with which the UE has a signaling connection are different non-E-UTRAN cells.

13. The UE of claim 2 wherein the non-E-UTRAN target cell and the non-E-UTRAN cell with which the UE has a signaling connection are the same non-E-UTRAN cell.

14. The UE of claim 2 wherein the UE is configured to receive signaling from a mobile management entity to suspend the PS services when the ISR is activated before a CSFB call.

15. The UE of claim 2 further comprising two or more antennas configured to communicate with eNBs that provide cells with which the UE has a signaling connection with.

16. A non-transitory computer-readable storage medium that stores instructions for execution by one or more processors of a user equipment (UE) to configure the UE to perform operations for inter-RAT cell reselection, the operations to configure the one or more processors to configure the UE to:
receive signaling to activate idle mode signal reduction (ISR) for subsequent use during inter-RAT cell reselection while the UE is in idle mode;
perform inter-RAT cell reselection in accordance with ISR when ISR is activated, the inter-RAT cell reselection to establish a circuit-switched (CS) radio signaling connection within a target cell when the target cell is a non-E-UTRAN cell;
transmit signaling to suspend packet switched (PS) services while the UE has a signaling connection within a non-E-UTRAN cell;
transmit signaling to initiate a tracking area update (TAU) procedure when ISR is activated to resume PS services when the UE returns to a E-UTRAN cell; and based on an unsuccessful resumption of PS services, deactivate ISR after returning to the E-UTRAN cell prior to initiating another TAU procedure to resume PS services.

17. The non-transitory computer-readable storage medium of claim 16 wherein the UE is configured to deactivate ISR locally by setting a temporary identity used in next update (TIN) parameter of the UE to a value indicating a Packet-Temporary Mobile Scriber Identity (P-TMSI) before initiating the TAU procedure,
wherein the P-TMSI refers to a RAT with which the UE was established before the inter-RAT cell reselection.

18. The non-transitory computer-readable storage medium of claim 17 wherein to perform the inter-RAT cell reselection in accordance with ISR, the UE is configured to refrain from initiating a routing area update (RAU) procedure when reselecting a GERAN cell of a routing area corresponding to a routing area identification that was stored by the UE during a last RAU procedure and a temporary identity used in next update (TIN) parameter of the UE is set to a value indicating a RAT-related Temporary Mobile Scriber Identity (TMSI).

* * * * *